(12) United States Patent
Shibata

(10) Patent No.: US 7,571,262 B2
(45) Date of Patent: Aug. 4, 2009

(54) IMAGE FORMING DEVICE INCLUDING MEANS FOR AUTOMATICALLY UPDATING DEVICE PROGRAM AND DEVICE SETTING INFORMATION

(75) Inventor: Tetsuya Shibata, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 418 days.

(21) Appl. No.: 11/008,602

(22) Filed: Dec. 9, 2004

(65) Prior Publication Data

US 2005/0132091 A1    Jun. 16, 2005

(30) Foreign Application Priority Data

Dec. 16, 2003    (JP)    ............... 2003-418258

(51) Int. Cl.
  *G06F 3/00* (2006.01)
  *G06F 15/177* (2006.01)
  *G06F 9/00* (2006.01)
(52) U.S. Cl. ............................................. 710/8; 713/1
(58) Field of Classification Search ...................... 713/1
  See application file for complete search history.

(56) References Cited

U.S. PATENT DOCUMENTS

| | | | | |
|---|---|---|---|---|
| 5,666,293 | A * | 9/1997 | Metz et al. ................... | 709/220 |
| 6,349,203 | B1 | 2/2002 | Asakoa et al. | |
| 6,418,555 | B2 * | 7/2002 | Mohammed ................ | 717/169 |
| 6,708,231 | B1 * | 3/2004 | Kitagawa ..................... | 710/10 |
| 2001/0044934 | A1 * | 11/2001 | Hirai et al. .................... | 717/11 |
| 2002/0067504 | A1 * | 6/2002 | Salgado et al. ............. | 358/1.15 |
| 2002/0073304 | A1 * | 6/2002 | Marsh et al. .................. | 713/1 |
| 2003/0041127 | A1 * | 2/2003 | Turnbull ..................... | 709/220 |

FOREIGN PATENT DOCUMENTS

| | | |
|---|---|---|
| JP | 08-251336 | 9/1996 |
| JP | 11-184651 | 7/1999 |
| JP | 2001-337817 | 12/2001 |

* cited by examiner

*Primary Examiner*—Henry W. H. Tsai
*Assistant Examiner*—Kris Rhu
(74) *Attorney, Agent, or Firm*—Renner, Otto, Boisselle & Sklar, LLP

(57) ABSTRACT

The present invention provides an information processing device that comprises an information storage section for storing device setting information of the information processing device and a program for bringing the information processing device into operation; a firmware version judgment section for comparing, upon reception of updating data that includes device setting information and version information, the version information of a program contained in the updating data and version information of the program stored in the storage section; wherein: an upgrading judgment section brings the acquirement section into operation to obtain a program corresponding to the version information of a program contained in the updating data so as to update the program stored in the storage section and the device setting information when the version information of a program contained in the updating data and the version information of the program stored in the storage section are not identical, and updates the device setting information when the version information of a program contained in the updating data and the version information of the program stored in the storage section are identical.

16 Claims, 10 Drawing Sheets

FIG. 3

| | | | |
|---|---|---|---|
| DEVICE SETTING INFORMATION | 1 | PAPER FEEDER SETTING | TRAY 1:A4  TRAY 2:B4  TRAY 3:A3 |
| | 2 | SHUT-OFF TIME | 10 MINUTES |
| | 3 | TONER SAVING | ON |
| | 4 | AUTOMATIC RECEPTION | ON |
| | 5 | DIAL SETTING | PB |
| | 6 | HAND-SET | ON |
| | 7 | TELEPHONE/FACSIMILE | ON |
| | 8 | RING TIME | 3 TIMES |
| | 9 | PRINTING OF RESULT | ONLY IN CASE OR ERROR |
| | 10 | SENDER INFORMATION | SHARP DOCUMENT DEPARTMENT |
| | ... | ... | ... |
| | L | | |
| ADDRESS BOOK | ABBREVIATED DIALING KEY 1 | | SHARP document system group 06-111-2345 |
| | ABBREVIATED DIALING KEY 2 | | SUZUKI ELECTRICS CO. LTD. 03-333-6666 |
| | ABBREVIATED DIALING KEY 3 | | TAIYO INDUSTRIES 03-555-3333 |
| | ... | | ... |
| | ABBREVIATED DIALING KEY M | | |
| | ONE-TOUCH DIALING KEY 1 | | YAMAMOTO ELECTRIC DEVICES 06-222-5555 |
| | ONE-TOUCH DIALING KEY 2 | | KAWASAKI RADIO ENGINEERING 06-888-7777 |
| | ONE-TOUCH DIALING KEY 3 | | KINOSHITA INDUSTRIES 06-777-3333 |
| | ... | | ... |
| | ONE-TOUCH DIALING KEY N | | |

FIG. 4

AUTOMATIC UPGRADING SETTING

☑ PERMITTED     ☐ PROHIBITED

AUTOMATIC UPGRADING NOTIFICATION

☑ NOTIFY     ☐ NO NOTIFICATION

IMAGE FORMING DEVICE INCLUDING MEANS FOR AUTOMATICALLY UPDATING DEVICE PROGRAM AND DEVICE SETTING INFORMATION

This Nonprovisional application claims priority under 35 U.S.C. § 119(a) on patent application No. 2003/418258 filed in Japan on Dec. 16, 2003, the entire contents of which are hereby incorporated by reference.

FIELD OF THE INVENTION

The present invention relates to an information processing device suitable for a network system made up of plural information processing devices connected via a communication line wherein device setting information is updated through the communication line.

BACKGROUND OF THE INVENTION

"Device cloning" has invented to duplicate setting of a device to others in order to realize simultaneous and uniform setting of plural devices and for ease of burden in separate setting for each device. When the device cloning is enforced between plural devices that use different versions of firmware, particularly when the device in the receiving side uses an older version than the device in the sending end and besides the number of setting items in the receiver device is less than that of the sender device, the receiver device may have some difficulties in operating completely like the sender device or may not start up in the first place. Incidentally, Japanese Laid-Open Patent Application Tokukaihei 08-251336/1996 (published on Sep. 27, 1996) describes a structure that performs shifting of parameter data, upgrading (updating) of the program etc. However, because these operations for shifting parameter data and for upgrading the program are not associated in the structure, those operations need to be performed separately. Therefore, the user has a concern for necessity of concurrent upgrading of the program whenever the parameter shifting is performed.

As described, in the structure of Tokukaihei 08-251336, the shifting of parameter data and upgrading of the program need to be performed separately because those operations are not associated. For example, if the parameter is shifted between two different versions of program, the device may not work properly. Specifically, the Tokukaihei 08-251336 has a problem that the user needs to care of necessity of concurrent upgrading operation of the program whenever the parameter shifting is performed.

SUMMARY OF THE INVENTION

The object of the present invention is to provide an information processing device that appropriately accommodates updating in device setting.

In order to attain the foregoing object, the information processing device according to the present invention comprises: a storage section for storing device setting information of the information processing device and a program for bringing the information processing device into operation; a comparison section for comparing, upon reception of updating data that includes device setting information and version information, the version information of a program contained in the updating data and version information of the program stored in the storage section; an updating section for updating the device setting information, or both the device setting information and the program, that are stored in the storage section, depending on a result of comparison by the comparison section; and an acquirement section for externally obtaining the program based on an instruction from the updating section, wherein: the updating section brings the acquirement section into operation to obtain a program corresponding to the version information of a program contained in the updating data so as to update the program stored in the storage section and the device setting information when the version information of a program contained in the updating data and the version information of the program stored in the storage section are not identical, and updates the device setting information when the version information of a program contained in the updating data and the version information of the program stored in the storage section are identical.

With the foregoing arrangement, judgment is carried out as to whether or not the program needs to be upgraded before carrying out updating of the device setting information. On this account, for example, it is possible to securely prevent malfunction of the device that may occur when only the device setting information is updated. With this function, the present invention provides the information processing device free from problems in operation even when only the device setting information is updated. Further, this arrangement allows simultaneous updating of the device setting information and the program.

In order to attain the foregoing object, the information processing device according to the present invention comprises: a storage section for storing device setting information of the information processing device and a program for bringing the information processing device into operation; an item comparison section for carrying out comparison, upon reception of updating data that includes device setting information and version information, between type of items of the device setting information contained in the updating data and type of items of the device setting information stored in the storage section; an updating section for updating the device setting information, or both the device setting information and the program, that are stored in the storage section, depending on a result of comparison by the item comparison section; and an acquirement section for externally obtaining the program based on an instruction from the item comparison section, wherein: when the type of items contained in the device setting information of the updating data do not contain all of the type of items contained in the device setting information stored in the storage section, the updating section brings the acquirement section into operation to obtain the program corresponding to the version information contained in the updating data so as to update the program stored in the storage section and the device setting information, and when all of the type of items contained in the device setting information stored in the storage section are contained in the type of items contained in the device setting information of the updating data, the updating section updates the device setting information.

With the foregoing arrangement, the item comparison section carries out comparison between type of items of the device setting information contained in the updating data having been externally supplied, and type of items of the device setting information of the program that has been previously registered in the information storage section. Then, according to the result of comparison, judgment can be carried out as to whether or not the program needs to be upgraded. Further, when all of the type of items contained in the device setting information stored in the storage section is contained in the type of items contained in the device setting information of the updating data, the updating section updates only the device setting information. With this function, the present invention provides the information processing device free from problems in operation regardless of the version of the program even when only the device setting information is updated.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3 is a drawing illustrating a data structure of a device cloning file.

FIG. 4 is a front view illustrating an example of a screen for setting automatic upgrading information.

DESCRIPTION OF THE EMBODIMENTS

First Embodiment

One embodiment of the present invention will be described below with reference to FIGS. 1 through 7.

The information processing device according to the present embodiment includes comparing means and updating means. Upon reception of externally-supplied updating data that includes the device setting information and the version information of the program, the comparing means compares the version information of the program included in the updating data with the version information of the program stored in the information storage section. Then, the updating means carries out judgment as to whether the two items of information are identical or not. When the updating means concludes that the two items of information are not identical, it updates the program and the device setting information. On the other hand, when the updating means concludes that the two items of information are identical, it updates only the device setting information.

As one specific example of the foregoing information processing device, the following explanation deals with a multifunctional device with plural functions, e.g., a photocopier, a fax device etc. Further, this multifunctional device uses firmware as the foregoing program.

Figure 1:
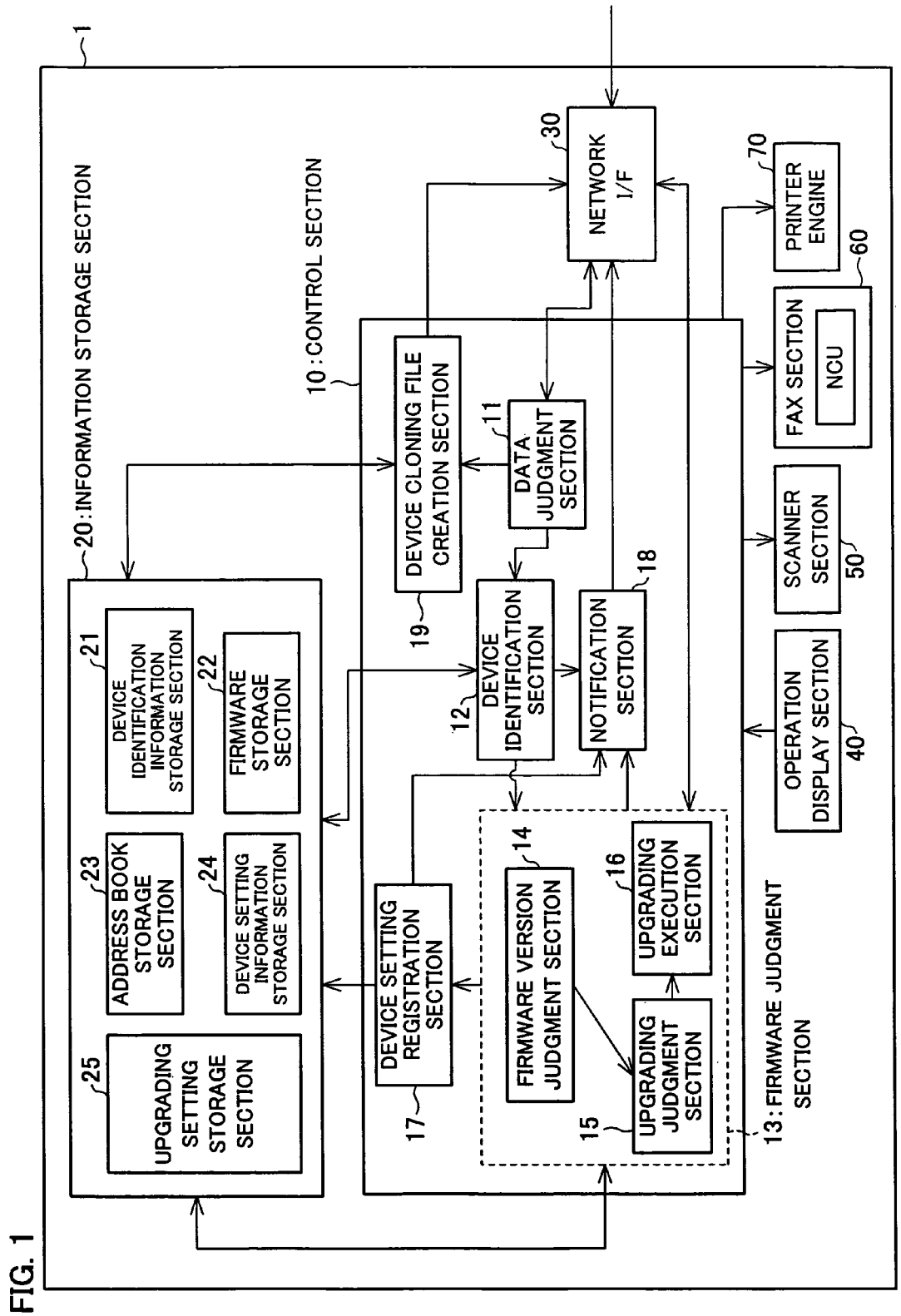
FIG. 1 is a functional block diagram illustrating a schematic structure of an information processing device according to one embodiment of the present invention.
Figure 2:
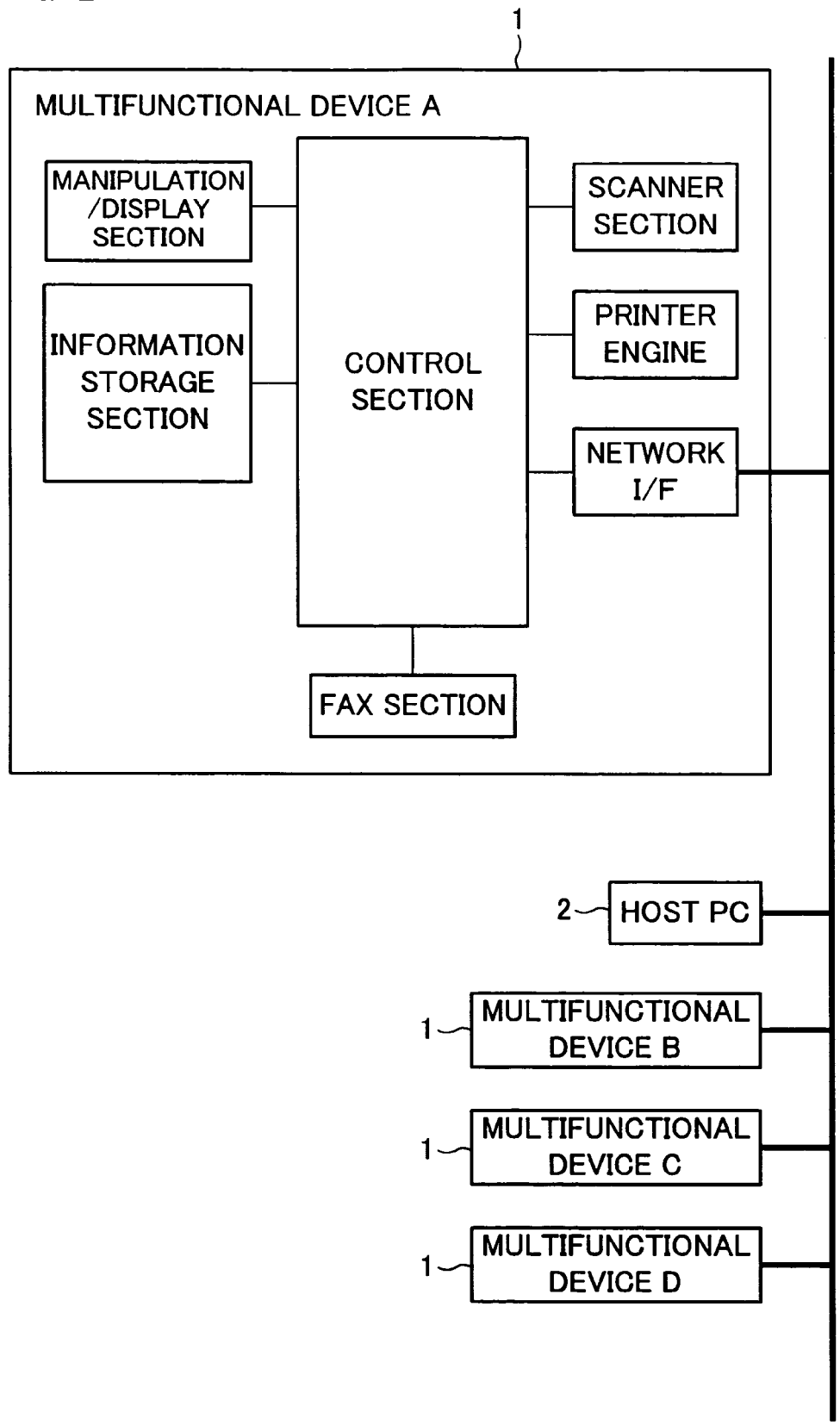
FIG. 2 is a block diagram illustrating a structure in which the information processing device of FIG. 1 is connected to a host PC via a communication line.

More specifically, as shown in FIGS. 1 and 2, the information processing device 1 of the present embodiment includes a control section 10, an information storage section (storing means) 20, a network I/F 30, a manipulation/display section (setting means) 40, a scanner section 50, a FAX section 60 and a printer engine 70. The structure of the control section 10 will be more specifically described later. Note that, in FIG. 2, the information processing device 1 is illustrated as a multifunctional device. Further, as shown in FIG. 2, the information processing device 1 is connected to other devices (host PC, other multifunctional devices) via a communication line. The host PC will be described later.

The information storage section stores various types of information. The information storage section 20 includes a device identification information storage section 21, a firmware storage section 22, an address book storage section 23, a device setting information storage section 24, and an upgrading setting storage section 25. The information stored in each of these storage sections will be described later.

The network I/F 30 performs external data (information) exchange of the information processing device 1 via a communication line.

The manipulation/display section 40 is constituted of an operation section and a display section (both not shown). The display section displays the current condition and image forming condition etc. of the information processing device 1. Further, the manipulation section is used for input of operation condition such as the number of copies of image forming, color depth of the image, sheet size for image forming, or other various condition in image forming, e.g., enlargement/reduction. Further, the display section is constituted of a liquid crystal panel or the like, and the manipulation section is constituted of some keys or the like. Further, the manipulation/display section 40 may be a touch panel type in which the manipulation section and the display section are unified.

The scanner section 50 scans a document image that is transferred from, for example, an automatic document transfer device.

The FAX section 60 converts an object of external facsimile transmission into FAX data. Then, the FAX data is transmitted to the destination via an NCU (Network Control Unit) provided in the FAX section 60.

The printer engine 70 performs image forming based on image data stored in an image information storage section (not shown) of the image information storage section 20, image data transmitted via the network I/F 30, and image data scanned by the scanner section 50.

Upon reception of a device cloning file (updating data), the information processing device 1 according to the present embodiment updates only the setting (the setting of the information processing device 1) or updates both the setting and the firmware that is included in the information processing device 1, depending on the content of the device cloning file. Further, upon transmission of a device cloning file creation signal (creation command signal, hereinafter) that is an externally-supplied signal as a request for creation of a device cloning file regarding the information processing device 1, the information processing device 1 creates a device cloning file that contains the setting and version information of the firmware. The created device cloning file is transmitted to the destination from which the creation command signal was sent.

Here, the device cloning file is explained below.

FIG. 3 is a drawing showing a data structure of the device cloning file. As shown in the figure, the device cloning file contains device setting information, address book information, device identification information (not shown), and the version information of the firmware.

The device setting information may be information regarding various settings for image forming operation of the information processing device 1. Further, the device setting information is classified into plural items corresponding to the respective settings of the information processing device 1. Those items may be, as shown in FIG. 3, setting of paper feeder, shut-off time, setting of toner saving etc. The address book information consists of addresses of the destinations or the like. The device identification information is information regarding various devices included in the information processing device 1, for example, in the case of a multifunctional device with functions of a photocopier and a printer. Further, the version information of the firmware is information regarding the firmware included in the information processing device 1. Note that, the items of the device setting information differs for each information processing device 1 depending on the device type etc.

The device setting information of the information processing device 1 is created and updated based on the content of the device cloning file by the control section 10 and the information storage section 20. The following minutely describes the control section 10 and the information storage section 20.

First, the following describes the structure of the control section 10 in detail. The control section 10 serves to control the information storage section 20, the network I/F 30, the manipulation/display section 40, the scanner section 50, the FAX section 60 and the printer engine 70. Specifically, as shown in FIG. 1, the control section 10 includes a data judgment section 11, a device identification section 12, a device setting registration section (updating means) 17, a notification section (notifying means) 18 and a device cloning file creation section 19. Further, the firmware judgment section 13 includes a firmware version judgment section (comparing means) 14, an upgrading judgment section (updating means) 15, and an upgrading execution section (obtaining means) 16.

The data judgment section 11 classifies various data externally transmitted via the network I/F. For example, when image data and a request for image forming of the image data are externally supplied, the data judgment section 11 sends the image data to the printer engine 70. Further, when receiving an externally-supplied device cloning file, the data judgment section 11 sends the device cloning file to the device identification section 70.

The device identification section 12 carries out examination of the device cloning file transmitted from the data judgment section 11 as to whether or not the file is appropriate and works properly. Further, the device identification section 12 compares the device identification information extracted from the device cloning file with the device identification information stored in the device identification information storage section 21 of the information processing device 1. Then, when the device identification section 12 concludes that the respective type of items of device identification information (device identification information contained in the device cloning film and the device identification information stored in the device) are identical, the device cloning file is transmitted to the firmware version judgment section 14. On the other hand, when the device identification section 12 concludes that the respective type of items of device identification information are not identical, the device cloning file is discarded, and the notification section 18 is brought into operation to notify the sender end, from which the device cloning file is sent, of the error. Here, the notification section 18 sends a message to the sender end, the message may be "the device cloning file is broken" or "the type of device for updating of the device setting information is not matched".

Note that, for example, when the device cloning file holds the device identification information regarding the printer, and the information processing device 1 stores the device identification information regarding the scanner, and if the setting of the device is updated according to this file, the information processing device 1 may malfunction. Therefore, in this case, the device cloning file is discarded. However, for example, when the device cloning file holds the device identification information regarding a multifunctional device including a printer function, and the information processing device 1 stores the device identification information regarding the printer, only the device setting information regarding a printer in the device cloning file is updated, and the information processing device 1 works properly. More specifically, the "matching" above does not always mean complete matching but may include the case where the device identification information in the device cloning file contains the device setting information of the information processing device 1 with the other information items. Note that, the updating of the device setting information will be described later.

The firmware judgment section 13 carries out judgment as to whether or not the device setting information is to be updated, according to the firmware version information contained in the device cloning file transmitted from the device identification section 12. Further, the firmware judgment section 13 compares the foregoing version information and the firmware version information stored in the firmware storage section 22 so as to determine whether or not the firmware is to be updated. The following describes this operation.

The firmware judgment section 13 includes the firmware version judgment section, the upgrading judgment section 15 and the upgrading execution section 16.

The firmware version judgment section 14 compares the firmware version information contained in the device cloning file and the firmware version information stored in the firmware storage section 22 of the information storage section 20. More specifically, the firmware judgment section 13 carries out judgment as to whether or not the firmware version information of the information processing device 1 and the version information contained in the device cloning file are identical.

According to the judgment result given by the firmware version judgment section 14, the upgrading judgment section 15 carries out one of the following operations with respect to the firmware and the device setting information included in the information storage section 20: (1) update both the firmware and the device setting information; (2) update only the device setting information; (3) cancel the updating.

More specifically, the upgrading judgment section 15 updates only the device setting information in response to a signal that informs matching of the firmware version information contained in the device cloning file with the firmware version information stored in the firmware storage section 22.

Further, in response to a signal that informs failure in matching the firmware version information contained in the device cloning file and the firmware version information stored in the firmware storage section 22, the upgrading judgment section 15 carries out different updating operations depending on whether or not automatic updating is selected in the setting.

More specifically, when the two items of version information are not matched, and the automatic firmware updating is permitted, the upgrading judgment section 15 updates both the firmware and the device setting information. On the other hand, when the two items of version information are not matched, and the automatic firmware updating is prohibited, the upgrading judgment section 15 carries out judgment as to whether or not the device will work properly if only the device setting information is updated without updating the firmware. When the upgrading judgment section 15 concludes that the device will work properly, it updates only the device setting information without updating the firmware. On the other hand, when the upgrading judgment section 15 concludes that the device will not work properly, it cancels the updating. The following explains this judgment of proper operation of the device.

The upgrading judgment section 15 carries out judgment as to whether or not the firmware needs to be upgraded (updated), based on the device setting information contained in the device cloning file transmitted from the firmware version judgment section 14 and the device setting information stored in the device setting information storage section 24 of the information storage section 20. This is because, in some cases, the device works properly even when the device setting information is updated though the version of the firmware stored in the firmware storage section 22 of the information storage section 20 is not identical to the version of the firmware included in the device cloning file. In this case, the upgrading of the firmware is not necessary. More specifically, the firmware version judgment section 14 only carries out comparison between the firmware version information included in the device cloning file and the firmware version information stored in the information storage section 20, while the upgrading judgment section 15 carries out judgment as to whether or not the updating of the device setting information can be enforced even when the two items of version information are not identical.

In practice, the upgrading judgment section 15 carries out judgment as to whether or not the type of items of the device setting information contained in the updating data includes all type of items of the device setting information stored in the information storage section 20 of the information storage section 20. In this way, the upgrading judgment section 15 carries out judgment as to whether or not the updating can be performed only for the device setting information.

Further, the upgrading judgment section 15 carries out judgment as to whether or not the automatic upgrading of the firmware of the information processing device 1 is permitted, based on the upgrading setting information stored in the upgrading setting storage section 25 of the information storage section 20.

Further, if the automatic upgrading is permitted, and if it is concluded in the judgment step that the upgrading of the firmware is necessary, the upgrading judgment section 15 sends a firmware acquirement command to the upgrading execution section 16. Further, if the automatic upgrading is prohibited even though the upgrading of the firmware is necessary, the upgrading judgment section 15 brings the notification section 18 into operation to notify the sender end of the necessity of upgrading of the firmware.

Upon reception of the firmware acquirement command from the upgrading judgment section 15, the upgrading execution section 16 obtains a corresponding firmware from an external device and updates the firmware stored in the information storage section 20. After thus completing the upgrading operation, the upgrading execution section 16 sends the device cloning file to the device setting registration section 17 so as to cause the device setting registration section 17 to renew the device setting information. Further, if the setting stored in the upgrading setting storage section 25 of the information storage section 20 includes notification of execution of the upgrading operation to the sender end, the upgrading execution section 16 brings the notification section 18 into operation to notify the sender end of the completion of the automatic upgrading after the execution of upgrading operation.

The device setting registration section 17 updates its own device setting information stored in the device setting storage section of the information storage section 20, based on the device setting information contained in the device cloning file transmitted from the firmware judgment section 13. Further, the device setting registration section 17 updates the address information stored in the address book storage section 23 of the information storage section 20, based on the address book information contained in the device cloning file. Then, after completion of updating of the device setting information, the device setting registration section 17 brings the notification section 18 into operation to notify the sender end of the completion of updating of setting. The notification section 18 is serves to notify the sender end of various kinds of information.

The following explains the information storage section 20. The information storage section 20 includes the device identification information storage section 21, the firmware storage section 22, the address book storage section 23, the device setting information storage section 24, and the upgrading setting storage section 25. The device identification information storage section 21 stores device setting information of the information processing device 1. The firmware storage section 22 stores the firmware and version information of the firmware. The address book storage section 23 stores address book information. The upgrading setting storage section 25 stores automatic upgrading setting information that informs either permission or prohibition of the automatic upgrading operation, and automatic upgrading notification information that informs necessity of notification of completion of the automatic upgrading operation when the automatic upgrading is executed.

Note that, the automatic upgrading setting information may be changed to any arbitrary setting by the user through the manipulation/display section 40 of the information processing device 1, for example, with the display shown in FIG. 4. FIG. 4 is a front view illustrating an example of a screen for setting automatic upgrading information.

The device cloning file creation section 19 serves to create the device cloning file based on various kinds of information stored in the information storage section 20, in response to reception of the externally-supplied creation command signal.

Figure 5:
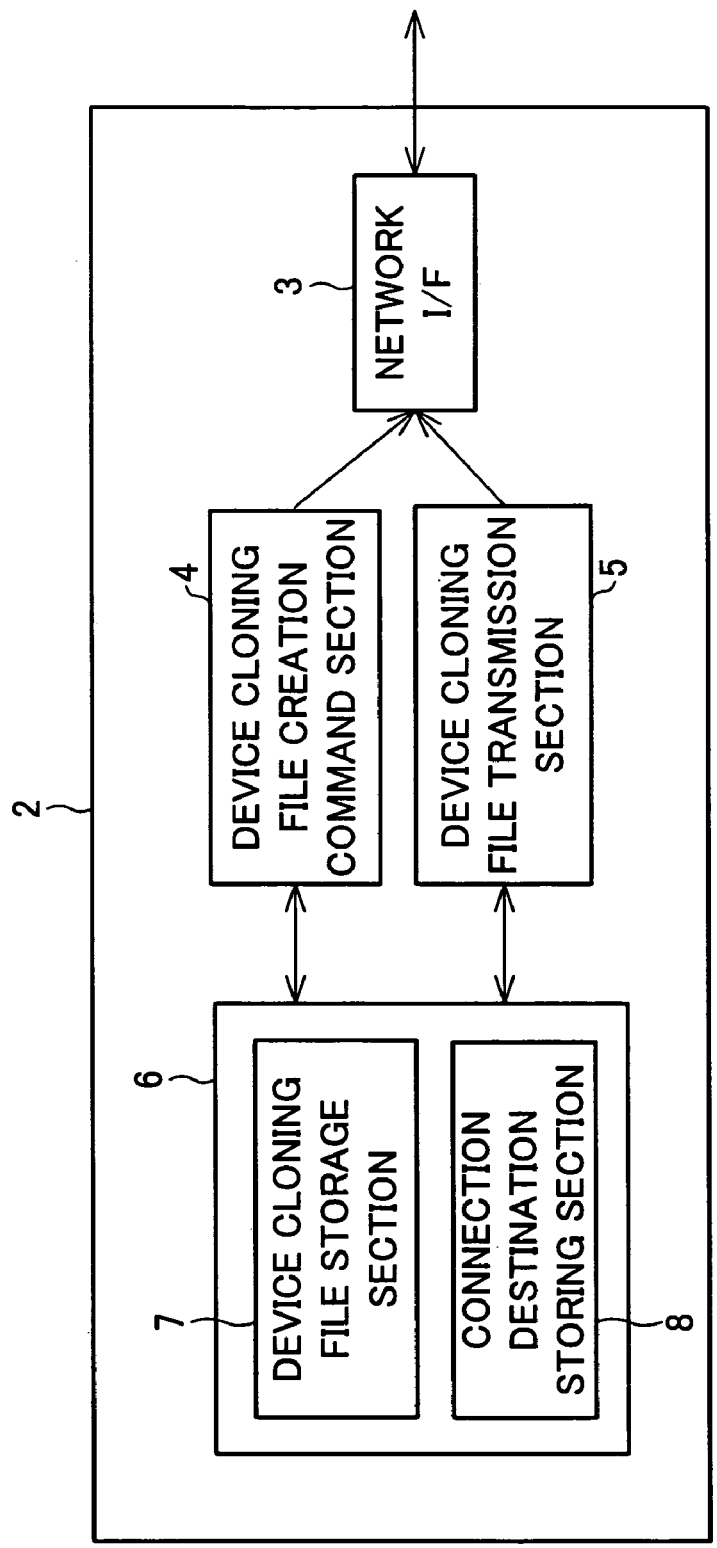
FIG. 5 is a block diagram illustrating a schematic structure of the host PC connected to the information processing device via a communication line.

FIG. 5 is a block diagram illustrating a schematic structure of a host PC 2 connected to the information processing device 1 via a communication line. The following explains the host PC 2 that performs transmission of the creation command signal and the device cloning file to the information processing device 1. Note that, the transmission of the creation command signal and the device cloning file are performed not always by the host PC 2 but by any devices connected to the information processing device 1 via a communication line; for example, it can be another information processing device 1.

The host PC 2 includes the I/F 3, the device cloning file creation command section 4, the device cloning file transmission section 5, and the storage section 6. Further, the storage section 6 includes the device cloning file storage section 7 and the connection destination storage section 8.

The I/F 3 carries out data exchange through a communication line. The host PC 2 and the information processing device 1 are connected to each other via a communication line.

The device cloning file creation command section 4 serves to transmit the creation command signal to the information processing device 1 that is connected thereto via a communication line 4.

The device cloning file storage section 7 stores the device cloning file transmitted from the information processing device 1. The connection destination storage section 8 stores IP addresses etc. of various devices of the information processing device 1 connected to the host PC 2 via a communication line.

The device cloning file transmission section 5 serves to transmit the device cloning file, stored in the device cloning file storage section 7, to the information processing device 1.

More specifically, the host PC 2 causes the information processing device 1 to create the device cloning file by transmission of the creation command signal. Then, the host PC 2 stores the device cloning file transmitted from the information processing device 1, and delivers the created device cloning file to the other information processing device (s) 1.

Figure 6:
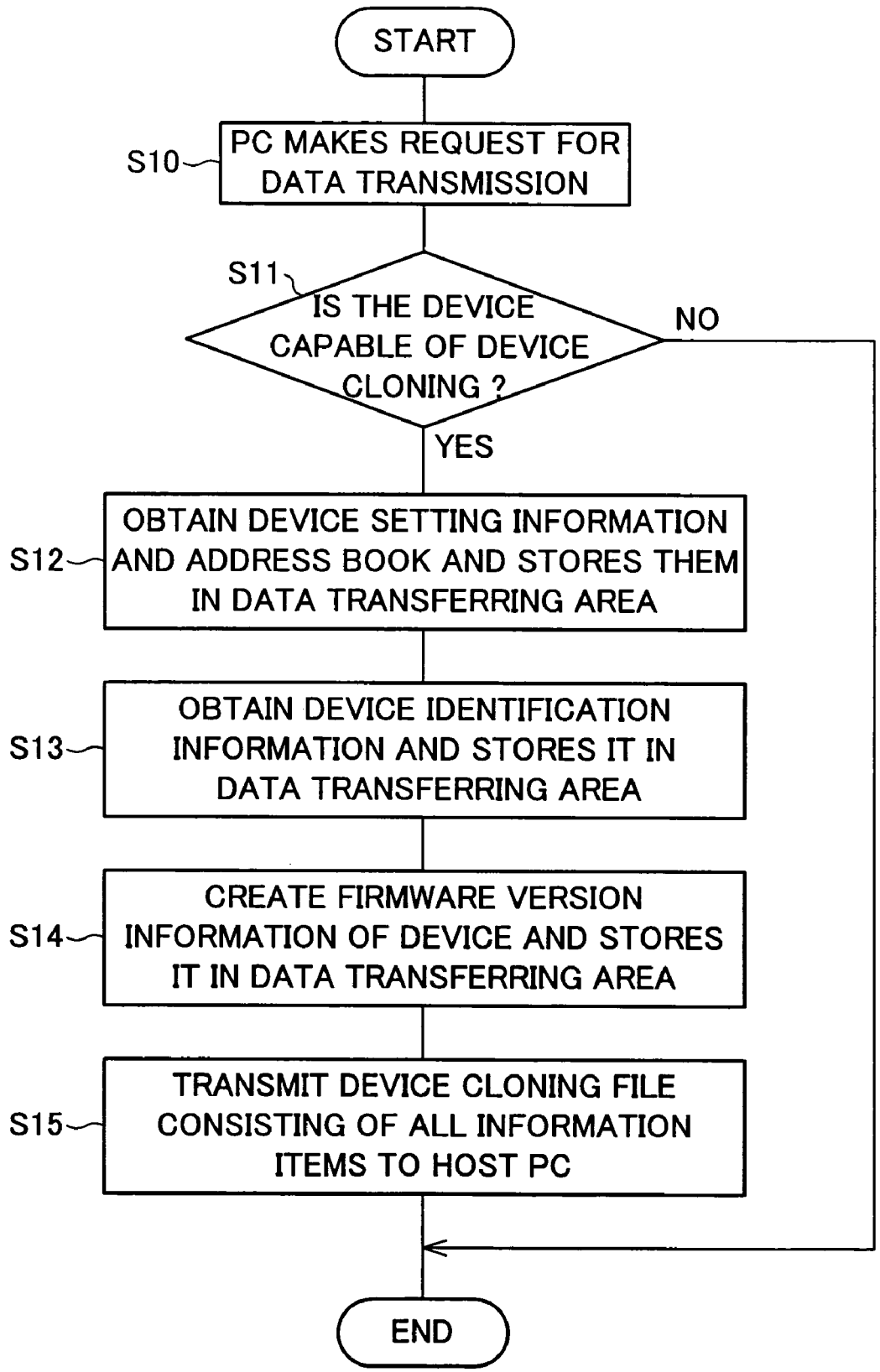
FIG. 6 is a flow chart showing operation of the information processing device in reception of a creation command signal from the host PC.

Here, with reference to the flow chart of FIG. 6, the following explains operation of the information processing device 1 upon reception of the creation command signal from the host PC 2.

First, the creation command signal is transmitted to the information processing device 1 (S10). Then, receiving the creation command signal, the information processing device 1 carries out judgment as to whether or not the creation of the device cloning file is possible (S11). More specifically, the data judgment section 11 carries out judgment as to whether the data transmitted from the host PC 2 is a creation command signal or not, and if this judgment fails to confirm that the transmitted data from the PC 2 is a creation command signal, the operation is finished.

If the data judgment section 11 concluded that the transmitted data from the PC 2 is a creation command signal, the data judgment section 11 transmits the creation command signal to the device cloning file creation section 19. Then, receiving the creation command signal, the device cloning file creation section 19 obtains the device setting information and the address book information respectively stored in the device setting information storage section 24 and in the address book storage section 23, and stores these items of information in the data transferring area (S12).

Next, the device cloning file creation section 19 obtains the device identification information stored in the device identification information storage section 21, and stores the information in the data transferring area (S13).

Further, the device cloning file creation section 19 obtains the firmware version information stored in the firmware storage section 22, and stores the information in the data transferring area (S14).

Then, the device cloning file creation section 19 transmits a device cloning file, consisting of the all items of information obtained through the steps S12 through S14, the device setting information, the address book information, the device identification information, and the version information, to the host PC 2 from which the creation command was sent (S15). In this manner, the information processing device 1 creates the device cloning file, and transmits the file to the host PC 2 as requested.

Figure 7:
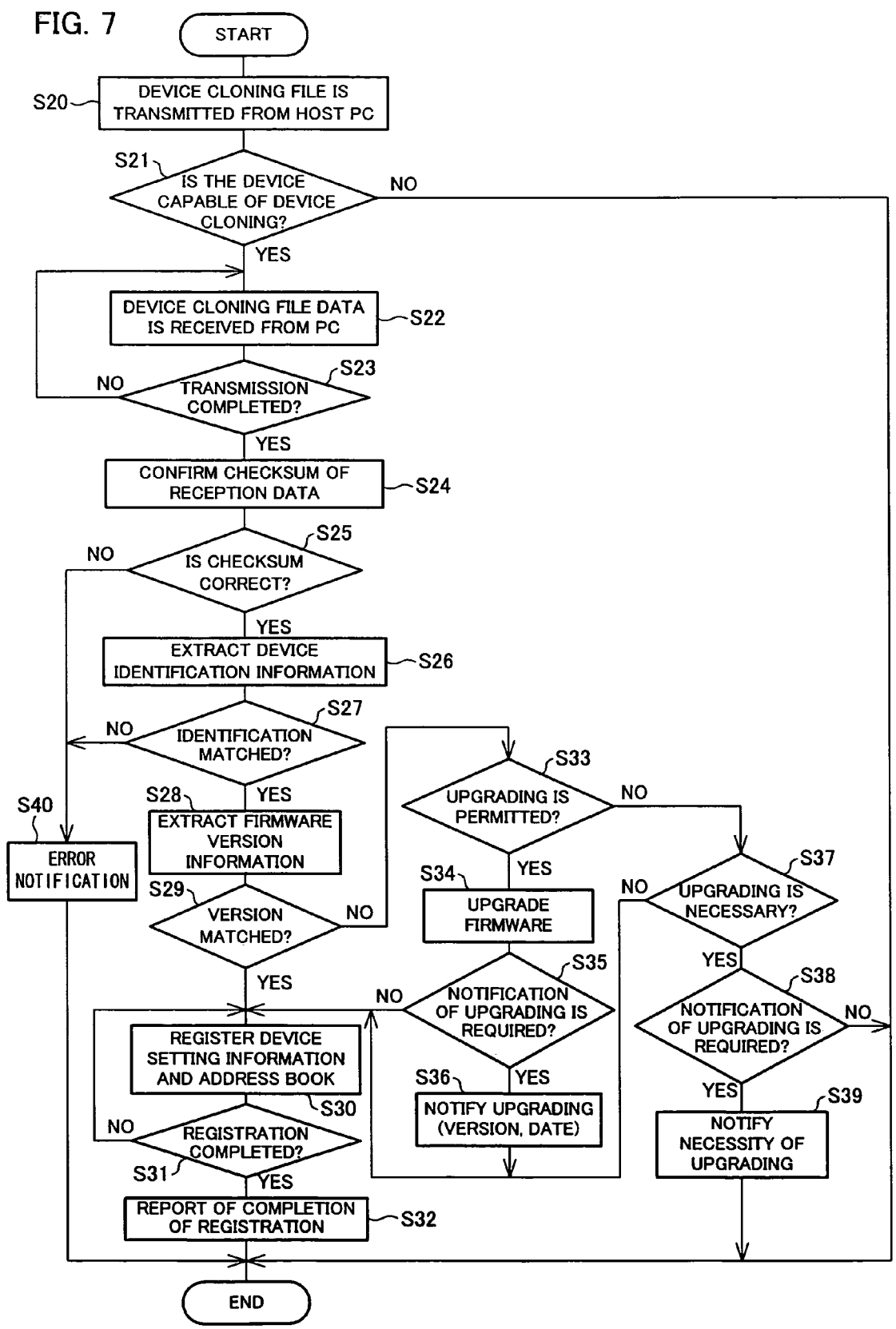
FIG. 7 is a flow chart showing operation for updating device setting information in the information processing device when a device cloning file is transmitted from the host PC.

Next, with reference to the flow chart of FIG. 7, the following explains operation for updating device setting information in the information processing device 1 when a device cloning file is transmitted from the host PC.

First, the device cloning file is transmitted from the host PC 2 to the target information processing device 1 subjected to updating of the device setting information (S20). Note that, in this case, the device cloning file is either transmitted from the other information processing device 1 or one created in the host PC 2.

Next, receiving the device cloning file, the information processing device 1 carries out judgment by referring to the received device cloning file as to whether or not the device is capable of change in device setting information using the device cloning file (S21). More specifically, the data judgment section 11 carries out judgment as to whether or not the data transmitted from the host PC 2 is a device cloning file. Here, if this judgment fails to confirm that the transmitted data from the PC 2 is a device cloning, the operation is finished.

Then, if the data judgment section 11 confirms that the transmitted data from the PC 2 is a device cloning file, the data judgment section 11 receives the device cloning file (S22), and confirms completion of the reception (S23).

Next, the data judgment section 11 transmits the received device cloning file to the device identification section 12. Then, the device identification section 12 carries out confirmation of checksum of the received device cloning file (S24), and further carries out judgment as to whether or not the confirmation result is correct.

When the step S25 found that the checksum is correct, the device identification section 12 extracts the device identification information from the received device cloning file (S26). Further, the device identification section 12 carries out judgment as to whether or not this device identification information is identical to the device identification information stored in the device identification information storage section 21 (S27).

When concluding that the two items of device identification information are identical, the device identification section 12 transmits the foregoing device cloning file to the firmware version judgment section 14 of the firmware judgment section 13.

Next, the firmware version judgment section 14 extracts the version information from the received device cloning file (S28). Then, the firmware version judgment section 14 carries out judgment as to whether or not this version information is identical to the version information stored in its own firmware storage section (S29).

When the step S29 found that the two items of version information are identical, the firmware version judgment section 14 transmits the device cloning file to the device setting registration section 17.

Then, receiving the device cloning file, the device setting registration section 17 extracts the device setting information and the address book information contained in the device cloning file. Further, the device setting registration section 17 stores those extracted information in the device setting information storage section 24 and the address book storage section 23 (S30), respectively. Note that, if the device setting information storage section 24 and the address book storage section 23 already store the device setting information and the address book information, the device setting registration section 17 carries out updating of the stored information with the extracted device setting information and the address book information.

Then, the device setting registration section 17 carries out judgment as to whether or not the registration of the device setting information and the address book information is completed (S31). Further, when concluding the registration is done, the device setting registration section 17 brings the notification section 18 into operation to notify the sender end of completion of registration of the device setting information (S32). Then, the device setting information updating operation is finished.

When the step S29 found that the two items of version information are not identical, the firmware version judgment section 14 transmits the device cloning file to the upgrading judgment section 15.

Then, the upgrading judgment section 15 carries out judgment as to whether or not the automatic upgrading is selected, by referring to the upgrading setting information stored in the upgrading setting storage section 25 (S33).

Confirming that the automatic upgrading is permitted, the upgrading judgment section 15 transmits an upgrading command signal to the upgrading execution section 16. Receiving the upgrading command signal, the upgrading execution section 16 establishes connection with the external device via the network I/F 30, and carries out downloading of the corresponding firmware so as to perform updating of its own firmware (S34). More specifically, the upgrading execution section 16 stores the downloaded firmware in the firmware storage section 22; and then, when the upgrading is done, transmits notification of completion of upgrading operation to the upgrading judgment section 15.

Receiving the notification of completion, the upgrading judgment section 15 carries out judgment as to whether or not the execution of upgrading of the firmware is supposed to be notified to the sender end (S35), by referring to the upgrading setting information stored in the upgrading setting storage section 25. Then, when the step S35 found that the notification of upgrading is necessary, the upgrading judgment section 15 brings the notification section 18 into operation to notify the sender end of completion of upgrading of the firmware, and also brings the manipulation/display section 40 into operation to display the notice (S36). On the other hand, when the step S35 found that the notification of upgrading is not necessary, the upgrading judgment section 15 transmits the device cloning file to the device setting registration section 17, and performs the operations of steps S30 through S32.

When the step S33 found that the automatic upgrading is not permitted, the upgrading judgment section 15 compares the device setting information in the device cloning file and the device setting information stored in the device setting information storage section 24 of the information storage section 20 to carry out judgment as to whether or not upgrading is necessary (S37). Then, when the step S37 found that upgrading is necessary, the upgrading judgment section 15 further carries out judgment as to whether or not the necessity of upgrading of the firmware is supposed to be notified to the sender end (S38), by referring to the upgrading setting information stored in the upgrading setting storage section 25. Then, when the step S38 found that the notification of (necessity of) upgrading is necessary, the upgrading judgment section 15 brings the notification section 18 into operation to notify the sender end of necessity of upgrading, and also brings the manipulation/display section 40 into operation to display the notice (S39). When the step S38 found that the notification of (necessity of) upgrading is not necessary, the upgrading judgment section 15 finishes the operation.

Further, when the step S37 found that upgrading is not necessary, i.e., if it is found that the device will work properly even when the device setting information is updated with the existing firmware, the upgrading judgment section 15 transmits the device cloning file to the device setting registration section 17, and performs the operations of steps S30 through S32. Further, if the step S25 found that the checksum is not correct, the device identification section 12 brings the notification section 18 into operation to transmit a message, such as, "the device cloning file is broken" or "the device cloning file is improper" (S40).

Further, when the step S27 found that the two items of version information are not identical, the device judgment section brings the notification section 18 into operation to notify the sender end that the received device cloning file cannot be used for setting of device (S40).

As described, the information processing device 1 of the present embodiment includes an information storage section 20 for storing its own device setting information and a program for bringing itself into operation, and a network I/F 30 for performing data transmission/reception with an external device. The information processing device 1 further includes the firmware version judgment section 14 for comparing the program version information contained in updating data and the program version information stored in the information storage section 20 upon reception of the updating data that includes the device setting information and the program version information; the upgrading judgment section 15 for carrying out updating of only the device setting information or both the device setting information and the program; the upgrading execution section 16 for obtaining the program from an external device via the network I/F 30 according to the instruction from the upgrading judgment section 15, wherein: when concluding that two items of version information are not identical as a result of judgment by the firmware version judgment section 14, the upgrading judgment section 15 causes the upgrading execution section 16 into operation so as to obtain a corresponding program to the program stored in the updating data and updates the device setting information and the program stored in the information storage section 20; and when concluding that two items of version information are identical, the upgrading judgment section 15 updates only the device setting information.

With the foregoing arrangement, the firmware version judgment section 14 carries out comparison between the version information contained in the updating data having been externally supplied, and the version information of the program that has been previously registered in the information storage section 20. Then, according to the result of comparison, the upgrading judgment section 15 either carries out upgrading of the program and then carries out updating of the device setting information, or only updates the device setting information.

More specifically, with the foregoing arrangement, judgment is carried out as to whether or not the program needs to be upgraded before carrying out updating of the device setting information. On this account, it is possible to securely prevent malfunction of the device that may occur when only the device setting information is updated. With this function, the present invention provides the information processing device 1 free from problems in operation even when only the device setting information is updated.

Further, this arrangement allows simultaneous updating of the device setting information and the program.

Further, the information processing device 1 of the present embodiment is preferably arranged so that the acquirement section obtains the program from a sender of the updating data or a manufacturer of the program.

The sender of the updating data often stores a program with the same version information as that of the program contained in the updating data. Further, by obtaining a program from a manufacturer of the program, it is possible to obtain an appropriate program. In this way, a simple and appropriate program may be obtained.

Further, the information processing device 1 of the present embodiment preferably further comprises: a setting section for setting permission/prohibition of acquirement of the program corresponding to the version information of a program contained in the updating data when the updating section concludes that the version information of a program contained in the updating data and the version information of the program stored in the storage section are not identical, wherein: under the permission of acquirement of the program, the updating section brings the acquirement section into operation to obtain the program corresponding to the version information of a program contained in the updating data so as to update the program stored in the storage section and the device setting information, and under the prohibition of acquirement of the program, the updating section updates the device setting information.

In some cases, this arrangement allows the device to properly operate even when only the device setting information is updated though the program version information stored in the information storage section 20 is not identical to the program version information of the updating data. More specifically, the foregoing arrangement avoids unnecessary upgrading of the program.

Further, the information processing device 1 of the present embodiment is preferably arranged so that under the prohibition of acquirement of the program, the updating section carries out comparison between type of items of the device setting information contained in the updating data and type of items of the device setting information stored in the storage section, the updating section cancels updating of the device setting information when the type of items contained in the device setting information. of the updating data do not contain all of the type of items contained in the device setting information stored in the storage section, and the updating section updates the device setting information stored in the storage section when all of the type of items contained in the device setting information stored in the storage section are contained in the type of items contained in the device setting information of the updating data.

This arrangement allows, if required, updating of the device setting information without upgrading the program. Further, if there are any possibilities of malfunction of the device when the device setting information is updated without upgrading the program; more specifically, if it is concluded that the type of items contained in the device setting information of the updating data do not include all of the type of items contained in the device setting information stored in the information storage section 20, the updating of the device setting information is cancelled. This function securely prevents malfunction of the information processing device 1.

Further, the information processing device 1 of the present embodiment preferably further comprises: a notification section for transmitting a notification to a sender of the updating data, wherein: when canceling updating of the device setting information, the notification section notifies the sender of the cancellation of upgrading of the program.

With this arrangement, the sender is informed of cancellation of updating operation of the device setting information. That is, the sender is notified of the information processing device 1 that has failed the updating of the device setting information.

Further, the information processing device 1 of the present embodiment preferably further comprises: a notification section 18 for transmitting a notification to a sender of the updating data, wherein: when executing updating of the device setting information, the notification section 18 notifies the sender of the execution of upgrading of the program.

With this arrangement, the sender is informed of updating of the device setting information and concurrent upgrading of the program.

It should be noted that the information processing device 1 is not limited to the multifunctional device used in the foregoing explanation, but may be any devices capable of modification of its own setting via an external device and a communication line. Examples of the information processing device 1 include printer, FAX, photocopier, and scanner.

Further, the information processing device of the foregoing explanation simultaneously updates the device setting information and the address book information; however, the information processing device 1 may update only the device setting information according to the firmware version information.

Further, the foregoing explanation uses firmware as an example of the program: however, apart from this, the program may be an OS (operating system), a printer driver etc. That is, the foregoing program may be any kinds of program as long as it brings the whole or a part of the information processing device 1 into operation.

Note that, the respective sections of the control section 10 may be realized by a hardware logic; otherwise, the whole or a part of those sections may be realized by software with a CPU as described below.

Specifically, the control section 10 of the information processing device 1 includes a CPU (central processing unit) that executes commands of the control method of the information processing device 1 for realizing various functions of the respective blocks; a ROM (read only memory) storing the program; a RAM (random access memory) for developing the program, a storage device (storage medium) for storing the program and various data items, such as a memory; and maybe some other components. Further, the control section 10 may be provided with a storage medium containing a computer-readable program code (execution-type program, medium code program, source program) of the control program as software for realizing the foregoing functions of the information processing device 1, which program is read out and executed by the computer (or CPU or MPU). In this case, the program code read out from the storage medium directly realizes the foregoing functions, and the storage medium containing the program is regarded a part of the present invention.

As in this case, any means (section) described in the present specification does not necessarily denotes physical means but may be a structure in which the foregoing functions are realized by software. Further, the present invention includes a structure in which the function of a single mean is realized by plural physical means, or functions of plural means are realized by a single physical mean.

Further, the control program of the information processing device 1 of the present invention is a control program for causing a computer to function as aforesaid sections.

With this arrangement, the information processing device 1 can be realized by executing the respective means (sections) by a computer.

Further, the storage medium storing the control program of the information processing device 1 of the present invention may be a computer-readable storage medium, that stores a control program of the information processing device 1 for causing a computer to function as aforesaid sections.

Further, in the foregoing example, data exchange with an external device is performed through the network I/F 30. However, the information processing device 1 of the present invention does not necessarily have to carry out upgrading of the program (firmware) via a wired or wireless network. For example, the external device may be a device connectable to the information processing device 1 via a common/dedicated I/F, such as a PC card, an USB memory etc. That is, for example, the upgrading of the firmware may be performed by inserting a USB storing the firmware and the device setting information into the information processing device 1.

Further, the structure of the foregoing explanation allows selection between a mode for allowing automatic upgrading and a mode for prohibiting the automatic upgrading. However, the present invention is not limited to this structure but may include a function for compulsively carrying out upgrading. This structure in which the upgrading of firmware is compulsively performed is particularly effective, for example, in the case of a structure using a second-hand information processing device or an old stock information processing device, that needs to be upgraded in both program and device setting information at the same time.

Further, when the mode for notifying automatic upgrading is selected, the notification may be carried out with display by the manipulation/display section 40, with printing of a message of completion of the automatic upgrading by the printer engine 70, etc.

Second Embodiment

Another embodiment of the present invention is described below with reference to FIGS. 8 through 10. For ease of explanation, materials having the equivalent functions as those shown in the drawings pertaining to the foregoing First Embodiment will be given the same reference symbols, and explanation thereof will be omitted here.

An information processing device 31 according to the present embodiment carries out comparison between type of items of the device setting information contained in the device cloning file and type of items of the device setting information stored in the information storage section 20 of the information processing device 31 so as to determine whether the upgrading of the firmware is carried out or not.

Figure 8:
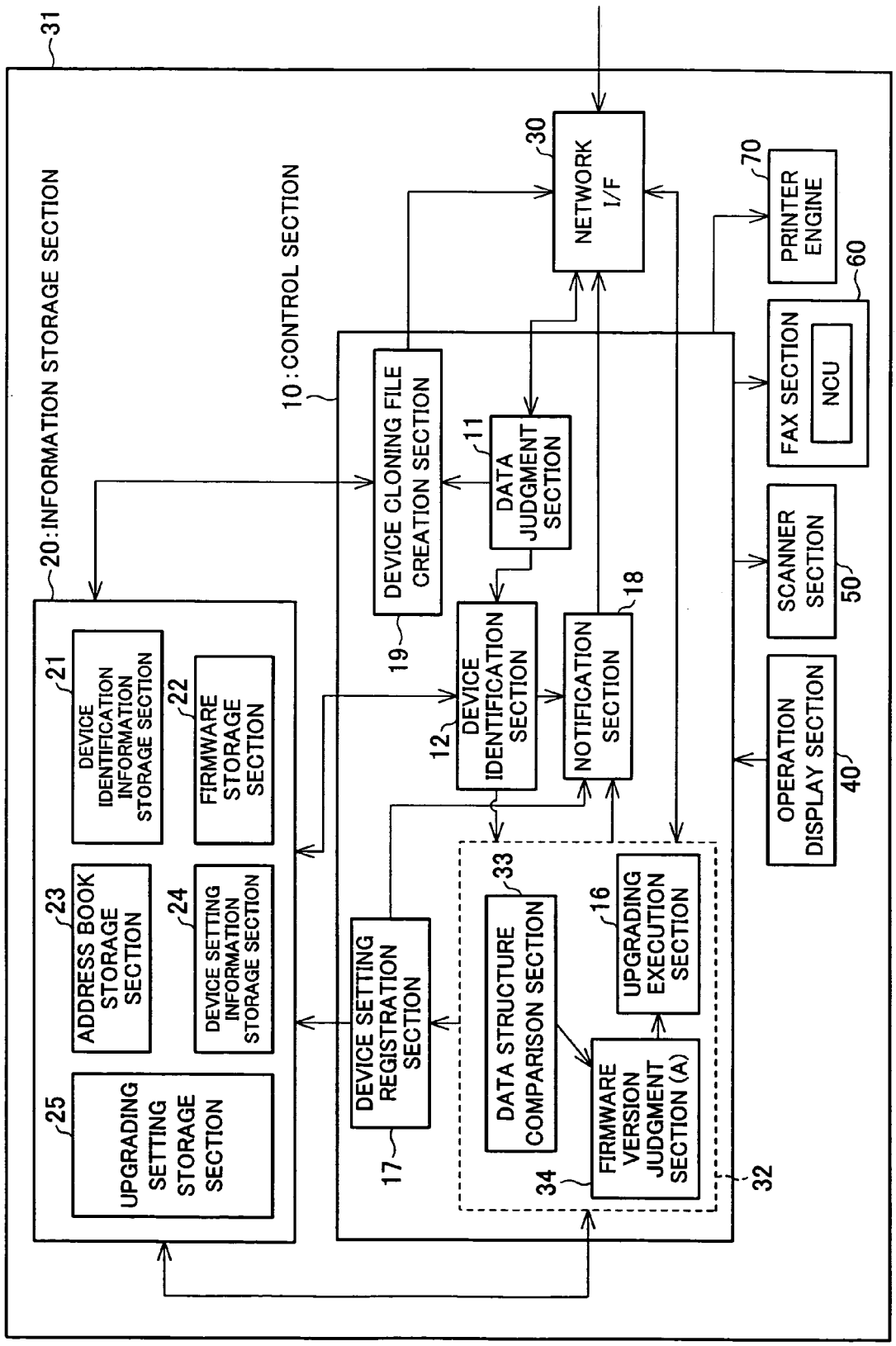
FIG. 8 is a functional block diagram illustrating a schematic structure of an information processing device according to another embodiment of the present invention.

FIG. 8 is a block diagram illustrating a schematic structure of the information processing device 31 according to the present embodiment.

As shown in FIG. 8, the information processing device 31 according to the present embodiment has the same structure and function as those of First Embodiment except for the firmware judgment section 13. For ease of explanation, the firmware judgment section 13 is referred to as a "firmware judgment section (A) 32" in the present embodiment. In the present embodiment, the firmware judgment section (A) 32 (updating means) includes a data structure comparison section (item comparing means) 33 and a firmware version judgment section (A) 34 and an upgrading execution section 16.

The data structure comparing section 33 serves to carry out comparison between type of items of the device setting information contained in the device cloning file and type of items of the device setting information stored in the information storage section 20 of the information processing device 31. More specifically, for example, the data structure comparison section 33 extracts the device setting information from the device cloning file and analyzes the type of items of the device setting information. Further, the data structure comparison section 33 carries out judgment as to whether or not the analyzed type of items are identical to the type of items of the device setting information stored in the information storage section 20 of the information processing device 31. Note that, the "identical" here denotes the case where all of the type of items contained in the device setting information stored in the storage section 20 are contained in the type of items of the device setting information of the device cloning file. More specifically, it denotes either the case where the type of items contained in the device setting information stored in the storage section 20 are completely identical to the type of items contained in the device setting information of the device cloning file, or the case where the type of items contained in the device setting information of the device cloning file include all of the type of items contained in the device setting information stored in the storage section 20 and further include some more type of items.

Figure 9:
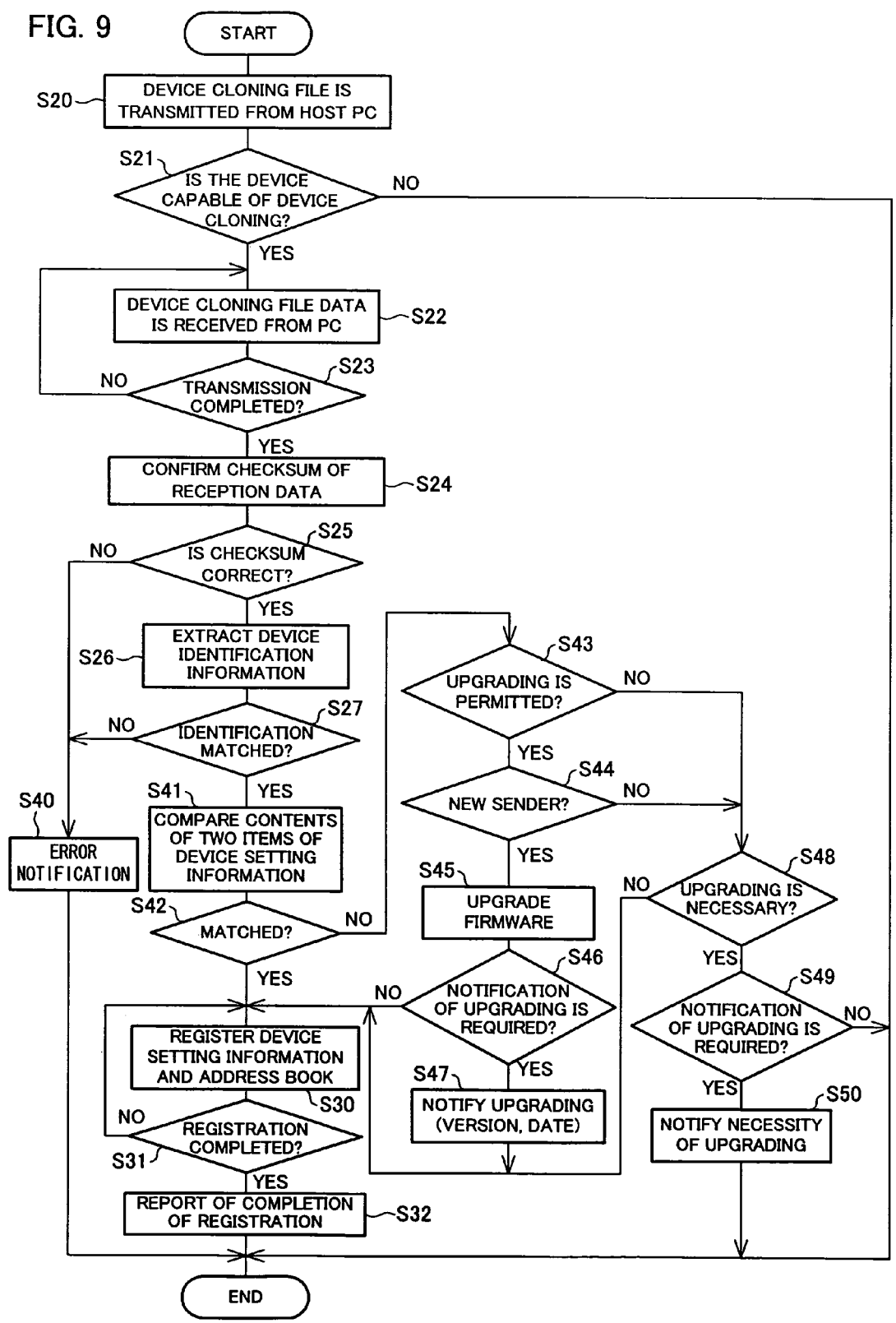
FIG. 9 is a flow chart showing another operation for updating device setting information in the information processing device when a device cloning file is transmitted from the host PC.

Next, with reference to the flow chart of FIG. 9, the following explain updating operation of the device setting information of the information processing device 31. Note that, the same steps as those shown in the foregoing First Embodiment will be given the same reference symbols, and explanation thereof will be omitted here.

When the judgment in the step S27 found that the two items of device identification information are identical, the device judgment section transmits the device cloning file to the firmware judgment section (A) 32. Receiving the device cloning file, the data structure comparison section 33 of the firmware judgment section (A) 32 extracts the device setting information and the address book information contained in the device cloning file. Further, the data structure comparison section 33 carries out comparison (S41) between the extracted type of items of the device setting information from the device cloning file and type of items of the device setting information stored in the information storage section 20 so as to carry out judgment as to whether those two sets of type of items are identical or not (S42).

When the step S42 found that the two sets of type of items are identical, the data structure comparison section 33 transmits the device cloning file to the device setting registration section 17, and performs the operations of steps S30 through S32.

On the other hand, when the step S42 found that the two sets of type of items are not identical, the data structure comparison section 33 further carries out judgment as to whether or not the automatic upgrading is selected by referring to the upgrading setting information stored in the upgrading setting storage section 25 (S43).

Then, when the step S42 found that the automatic upgrading is selected, the data structure comparison section 33 transmits the version information comparison command signal to the firmware version judgment section (A) 34. Receiving the version information comparison command signal, the firmware version judgment section (A) 34 extracts the version information from the device cloning file. Further, the firmware version judgment section (A) 34 compares the extracted information with the version information stored in the firmware storage section 22 so as to find out which of the items is a newer version (S44). The firmware judgment section (A) 34 then transmits the comparison result to the data structure comparison section 33.

Then, receiving an externally-supplied signal informing that the version information contained in the device cloning file is newer (Yes in S44), which signal is transmitted from the firmware version judgment section (A) 34, the data structure comparison section 33 transmits an upgrading command signal to the upgrading execution section 16. Receiving the upgrading command signal, the upgrading execution section 16 establishes connection with an external device to download via the network I/F30 so as to obtain a firmware corresponding to the version information of the device cloning file. Then, the upgrading execution section 16 uses the firmware thus downloaded for upgrading of the firmware stored in the device (S45). When the upgrading is completed, the upgrading execution section 16 transmits a notification of completion of upgrading to the data structure comparison section 33.

Receiving the notification of completion, the data structure comparison section 33 refers to the upgrading setting information stored in the upgrading setting storage section 25 for judgment as to whether or not the upgrading of firmware is supposed to be notified to the user (S46). When the step S46 found that the notification is required, the data structure comparison section 33 brings the notification section 18 into operation to notify the sender of execution of the upgrading of firmware, and also brings the manipulation/display section 40 into operation to display the notice (S47). Then, the data structure comparison section 33 transmits the device cloning file to the device setting registration section 17, and performs the operations of steps S30 through S32. When the step S46 found that notification of upgrading is not necessary, the upgrading judgment section 15 transmits the device cloning file to the device setting registration section 17, and performs the operations of steps S30 through S32.

On the other hand, if it was found in the step S43 that the automatic upgrading is prohibited, or if a signal informing that the version information contained in the device cloning file is older is received from the firmware version judgment section (A) 34 in the step S44, the data structure comparison section 33 carries out judgment whether or not the upgrading of firmware is necessary (S48).

Then, if it is found in the step S48 that the upgrading is necessary, the data structure comparison section 33 refers to the upgrading setting information stored in the upgrading setting storage section 25 for judgment as to whether or not the upgrading of firmware is supposed to be notified to the user (S49). If the step S49 found that the notification is required, the data structure comparison section 33 brings the notification section 18 into operation to notify the sender of execution of the upgrading of firmware, and also brings the manipulation/display section 40 into operation to display the notice (S50). When the step S49 found that the notification of upgrading is not required, the data structure comparison section 33 finishes the operation.

Further, when the step S48 found that upgrading is not necessary, i.e., if it was found that the device will work properly even when the device setting information is updated with the existing firmware, the data structure comparison section 33 transmits the device cloning file to the device setting registration section 17, and performs the operations of steps S30 through S32.

As described, the information processing device 31 of the present embodiment includes an information storage section 20 for storing its own device setting information and a program for bringing itself into operation, and a network I/F 30 for performing data transmission/reception with an external device. The information processing device 31 further includes the data structure comparison section 33 for comparing type of items of the device setting information contained in updating data and type of items of the device setting information stored in the information storage section 20 upon reception of the updating data that includes the device setting information and the program version information; the firmware version judgment section (A) 34 for carrying out updating of only the device setting information or both the device setting information and the program stored in the storage section 20, depending on the comparison result by the data structure comparison section 33; the upgrading execution section 16 for obtaining the program from an external device via the network I/F 30 according to the instruction from the data structure comparison section 33 wherein: when concluding that the type of items contained in the device setting information of the updating data do not contain all of the type of items contained in the device setting information stored in the storage section, based on the comparison result by the data structure comparison section 33, the firmware version judgment section (A) 34 causes the upgrading execution section 16 into operation so as to obtain a corresponding program to the program stored in the updating data and updates the device setting information and the program stored in the information storage section 20; and when all of the type of items contained in the device setting information stored in the storage section are contained in the type of items contained in the device setting information of the updating data, the firmware version judgment section (A) 34 updates only the device setting information.

With the foregoing arrangement, the data structure comparison section 33 carries out comparison between type of items of the device setting information contained in updating data, that has been transmitted, and type of items of the device setting information, that has been previously registered in the information storage section 20. Then, by referring to this result of comparison, determination as to whether the program is upgraded or not may be made. The data structure comparison section 33 carries out upgrading of the device setting information when all of the type of items contained in the device setting information stored in the storage section 20 are contained in the type of items contained in the device setting information of the updating data.

With this function, the present invention provides the information processing device 31 free from problems in operation regardless of the version of the program even when only the device setting information is updated.

Further, the information processing device 31 preferably further comprises: a setting section for setting permission/prohibition of acquirement of a program corresponding to the version information contained in the updating data when the firmware version judgment section (A) 34 concludes that the type of items contained in the device setting information of the updating data do not contain all of the type of items contained in the device setting information stored in the storage section, wherein: under the permission of acquirement of the program, the firmware version judgment section (A) 34 brings the acquirement section into operation to obtain the program corresponding to the first version information contained in the updating data so as to update the program stored in the storage section and the device setting information, and under the prohibition of acquirement of the program, the firmware version judgment section (A) 34 cancels updating of the device setting information.

With this arrangement, when the acquirement of a program is prohibited in setting, the updating of the device setting information is cancelled, thus more securely preventing malfunction.

In the foregoing explanation, execution of upgrading of firmware is determined depending on coincidence in type of items of the device setting information. In other words, in the foregoing example, judgment is carried out as to whether or not the device will work properly even when the device setting information is updated with no account of the version of firmware. However, in some cases, a newer firmware is always preferable regardless the content of the device setting information because firmware tends to be upgraded to work out bugs as soon as a new bug is found. In this view, even when the firmware is operative, upgrading may be performed with the following upgrading operation, that is performed before the step S30.

Further, in the foregoing explanation, the data structure comparison section 33 carries out comparison between the version information contained in the updating data having been externally supplied, and the version information of the program that has been previously registered in the information storage section 20. However, the present invention is not limited to this structure; for example, the data structure comparison section 33 may perform comparison in terms of type of items of the device setting information and the data structure of the items. By thus comparing type of items of the device setting information and the data structure of the items, more accurate upgrading may be performed, especially in such one possible case that the type of items are all identical but the data structures are different.

More specifically, the firmware judgment section (A) 32 brings the acquirement section into operation to obtain a program corresponding to the version information contained in the updating data so as to update the program stored in the storage section 20 and the device setting information when the type of items contained in the device setting information of the updating data do not contain all of the type of items contained in the device setting information stored in the storage section 20, or when all of the type of items contained in the device setting information stored in the storage section 20 are contained in the type of items contained in the device setting information of the updating data but the data structures of the items are not identical; and the firmware judgment section (A) 32 brings the device setting registration section 17 into operation to update the device setting information when all of the type of items contained in the device setting information stored in the storage section 20 are contained in the type of items contained in the device setting information of the updating data and the data structures of the items are identical.

More specifically, for example, when the program ver1.0 requires 10 bites of data for "feeder tray setting" of the device setting information while the program ver2.0 require 20 bites, this is regarded a difference in type of items of device setting information.

Figure 10:
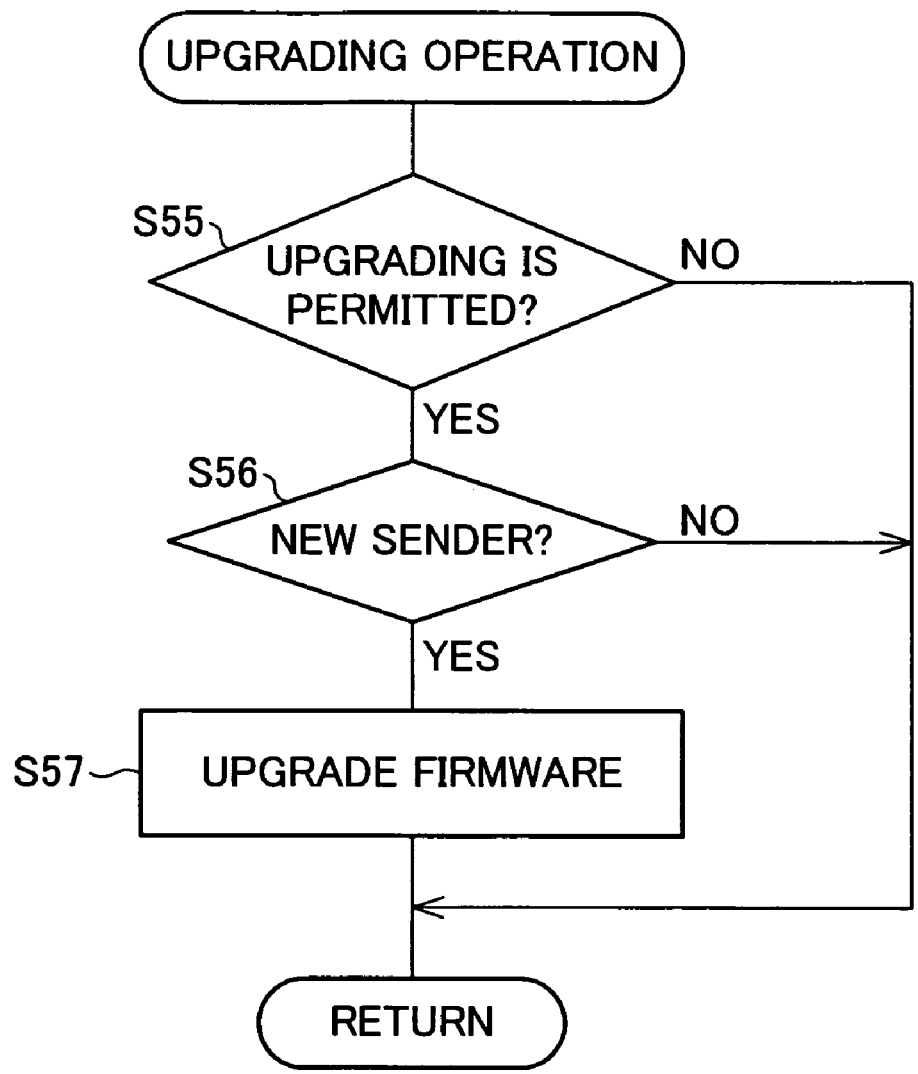
FIG. 10 is a flow chart showing upgrading operation.

FIG. 10 is a flow chart showing upgrading operation.

First, the data structure comparison section 33 carries out judgment as to whether or not the automatic upgrading is selected by referring to the upgrading setting information stored in the upgrading setting storage section 25 (S55).

Then, when the step S55 found that the automatic upgrading is selected, the data structure comparison section 33 transmits the version information comparison command signal to the firmware version judgment section (A) 34. Receiving the version information comparison command signal, the firmware version judgment section (A) 34 extracts the version information from the device cloning file. Further, the firmware version judgment section (A) 34 compares the extracted information with the version information stored in the firmware storage section 22 so as to carry out judgment whether or not the externally supplied version information is newer (S56). The firmware version judgment section (A) 34 then transmits the comparison result to the data structure comparison section 33.

Then, receiving an externally-supplied signal informing that the version information contained in the device cloning file is newer (Yes in S56), which signal is transmitted from the firmware version judgment section (A) 34, the data structure comparison section 33 transmits an upgrading command signal to the upgrading execution section 16. Receiving the upgrading command signal, the upgrading execution section 16 establishes connection with an external device to download via the network I/F30 so as to obtain a firmware corresponding to the version information of the device cloning file. Then, the upgrading execution section 16 uses the firmware thus downloaded for upgrading of the firmware stored in the device (S57). Then the sequence goes to the step S30.

On the other hand, if it was found in the step S55 that the automatic upgrading is prohibited, or if a signal informing that the version information contained in the device cloning file is older is received from the firmware version judgment section (A) 34 in the step S56, the operation is finished.

Further, in the foregoing explanation, the data structure comparison section 33 compares the two sets of type of items of device setting information. However, the present invention is not limited to this structure; for example, another possible structure may be that the data structure comparison section 33 extracts the type of items of the address book storage section 23 as well as the type of items of the device setting information to carry out judgment for coincidence of the data of the device cloning file with the data stored in the information storage section 20.

The information processing device according to the present invention is suitable for a network system with plural information processing devices connected via a communication line.

As described, the information processing device according to the present invention comprises: storing means for storing device setting information of the information processing device and a program for bringing the information processing device into operation and data transmission/reception means for performing external data exchange, the information processing device further comprises: comparing means for comparing, upon reception of updating data that includes device setting information and version information, the version information of a program contained in the updating data and version information of the program stored in the storing means; updating means for updating the device setting information, or both the device setting information and the program, that are stored in the storing means, depending on a result of comparison by the comparing means; and acquiring means for externally obtaining the program based on an instruction from the updating means, wherein: the updating means brings the acquiring means into operation to obtain a program corresponding to the version information of a program contained in the updating data so as to update the program stored in the storing means and the device setting information when the version information of a program contained in the updating data and the version information of the program stored in the storing means are not identical, and updates the device setting information when the version information of a program contained in the updating data and the version information of the program stored in the storing means are identical.

With the foregoing arrangement, judgment is carried out as to whether or not the program needs to be upgraded before carrying out updating of the device setting information. On this account, for example, it is possible to securely prevent malfunction of the device that may occur when only the device setting information is updated. With this function, the present invention provides the information processing device free from problems in operation even when only the device setting information is updated. Further, this arrangement allows simultaneous updating of the device setting information and the program.

As described, the information processing device according to the present invention comprises: storing means for storing device setting information of the information processing device and a program for bringing the information processing device into operation and data transmission/reception means for performing external data exchange, the information processing device further comprises: an item comparing means for carrying out comparison, upon reception of updating data that includes device setting information and version information, between type of items of the device setting information contained in the updating data and type of items of the device setting information stored in the storing means; updating means for updating the device setting information, or both the device setting information and the program, that are stored in the storing means, depending on a result of comparison by the item comparing means; and acquiring means for externally obtaining the program based on an instruction from the item comparing means, wherein: when the type of items contained in the device setting information of the updating data do not contain all of the type of items contained in the device setting information stored in the storing means, the updating means brings the acquiring means into operation to obtain the program corresponding to the version information contained in the updating data so as to update the program stored in the storing means and the device setting information, and when all of the type of items contained in the device setting information stored in the storing means are contained in the type of items contained in the device setting information of the updating data, the updating means updates the device setting information.

With the foregoing arrangement, the item comparison section carries out comparison between type of items of the device setting information contained in the updating data having been externally supplied, and type of items of the device setting information of the program that has been previously registered in the information storage section. Then, according to the result of comparison, judgment can be carried out as to whether or not the program needs to be upgraded. Further, when all of the type of items contained in the device setting information stored in the storage section are contained in the type of items contained in the device setting information of the updating data, the updating section updates only the device setting information.

With this function, the present invention provides the information processing device free from problems in operation regardless of the version of the program even when only the device setting information is updated.

Further, the information processing device according to the present invention is preferably arranged so that: the acquiring means obtains the program from a sender of the updating data or a manufacturer of the program. The sender of the updating data often stores a program with the same version information as that of the program contained in the updating data. Further, by obtaining a program from a manufacturer of the program, it is possible to obtain an appropriate program. In this way, a simple and appropriate program may be obtained.

Further, the information processing device according to the present invention preferably further comprises: a setting means for setting permission/prohibition of acquirement of the program corresponding to the version information of a program contained in the updating data when the updating means concludes that the version information of a program contained in the updating data and the version information of the program stored in the storing means are not identical, wherein: under the permission of acquirement of the program, the updating means brings the acquiring means into operation to obtain the program corresponding to the version information of a program contained in the updating data so as to update the program stored in the storing means and the device setting information, and under the prohibition of acquirement of the program, the updating means updates the device setting information.

In some cases, this arrangement allows the device to properly operate even when only the device setting information is updated though the program version information stored in the information storing means 20 is not identical to the program version information of the updating data. More specifically, the foregoing arrangement avoids unnecessary upgrading of the program.

Further, the information processing device according to the present invention is preferably arranged so that: under the prohibition of acquirement of the program, the updating means carries out comparison between type of items of the device setting information contained in the updating data and type of items of the device setting information stored in the storing means, the updating means cancels updating of the device setting information when the type of items contained in the device setting information of the updating data do not contain all of the type of items contained in the device setting information stored in the storing means, and the updating means updates the device setting information stored in the storing means when all of the type of items contained in the device setting information stored in the storing means are contained in the type of items contained in the device setting information of the updating data.

This arrangement allows, if required, updating of the device setting information without upgrading the program. Further, if there are any possibilities of malfunction of the device when the device setting information is updated without upgrading the program; more specifically, if it is concluded that the type of items contained in the device setting information of the updating data do not include all of the type of items contained in the device setting information stored in the information storing means 20, the updating of the device setting information is cancelled. This function securely prevents malfunction of the information processing device 1.

Further, the information processing device according to the present invention preferably further comprises: a setting means for setting permission/prohibition of acquirement of a program corresponding to the version information contained in the updating data when the updating means concludes that the type of items contained in the device setting information of the updating data do not contain all of the type of items contained in the device setting information stored in the storing means, wherein: under the permission of acquirement of the program, the updating means brings the acquiring means into operation to obtain the program corresponding to the version information contained in the updating data so as to update the program stored in the storing means and the device setting information, and under the prohibition of acquirement of the program, the updating means cancels updating of the device setting information.

With this arrangement, when the acquirement of a program is prohibited in setting, the updating of the device setting information is cancelled, thus more securely preventing malfunction.

Further, the information processing device according to the present invention preferably further comprises: a notification means for transmitting a notification to a sender of the updating data, wherein: when canceling updating of the device setting information, the notification means notifies the sender of the cancellation of upgrading of the program. This arrangement notifies the sender of the cancellation of the updating of the device setting information. That is, the sender is notified of the information processing device 1 that has failed the updating of the device setting information.

Further, the information processing device according to the present invention preferably further comprises: a notification means for transmitting a notification to a sender of the updating data, wherein: when executing updating of the device setting information, the notification means notifies the sender of the execution of upgrading of the program. With this arrangement, the sender is informed of updating of the device setting information and concurrent upgrading of the program.

Further, the information processing device according to the present invention is preferably arranged so that: the item comparing means carries out comparison between the device setting information contained in the updating data and the device setting information stored in the storing means in terms of type of items and data structure; the updating means brings the acquiring means into operation to obtain the program corresponding to the version information contained in the updating data so as to update the program stored in the storing means and the device setting information when the type of items contained in the device setting information of the updating data do not contain all of the type of items contained in the device setting information stored in the storing means, or when all of the type of items contained in the device setting information stored in the storing means are contained in the type of items contained in the device setting information of the updating data but their data structures are not identical; and the updating means updates the device setting information when all of the type of items contained in the device setting information stored in the storing means are contained in the type of items contained in the device setting information of the updating data and their data structures are identical.

By thus comparing type of items of the device setting information and the data structure of the items, more accurate upgrading may be performed, especially in such one possible case that the type of items are all identical but the data structures are different.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image forming device, comprising:
    a storage section for storing device setting information of the image forming device and a program serving to bring the image forming device into operation, the device setting information comprising settings of paper feeder, shut-off times and toner saving;
    a comparison section for comparing, upon reception of updating data that includes device setting information and version information, the version information contained in the updating data and version information of the program stored in the storage section;
    an updating section for updating the device setting information, or both the device setting information and the program, that are stored in the storage section, depending on a result of comparison by the comparison section; and
    an acquirement section for externally obtaining a program corresponding to the version information contained in the updating data, based on an instruction from the updating section,
    wherein:
    the updating section brings the acquirement section into operation to obtain the program corresponding to the version information contained in the updating data so as to update the program stored in the storage section and the device setting information stored in the storage section when the version information contained in the updating data and the version information of the program stored in the storage section are not identical, and updates only the device setting information stored in the storage section among the program stored in the storage section and the device setting information stored in the storage section when the version information contained in the updating data and the version information of the program stored in the storage section are identical.

2. The image forming device as set forth in claim 1, wherein:
    the acquirement section obtains the program corresponding to the version information contained in the updating data, from a sender of the updating data or a manufacturer of the program corresponding to the version information contained in the updating data.

3. The image forming device as set forth in claim 1, further comprising:
    a setting section for setting permission/prohibition of acquirement of the program corresponding to the version information contained in the updating data when the updating section concludes that the version information contained in the updating data and the version information of the program stored in the storage section are not identical,
    wherein:
    under the permission of acquirement of the program corresponding to the version information contained in the updating data, the updating section brings the acquirement section into operation to obtain the program corresponding to the version information contained in the updating data so as to update the program stored in the storage section and the device setting information stored in the storage section, and
    under the prohibition of acquirement of the program corresponding to the version information contained in the updating data, the updating section updates the device setting information stored in the storage section.

4. The image forming device as set forth in claim 3, wherein:
    under the prohibition of acquirement of the program corresponding to the version information contained in the updating data, the updating section carries out comparison between type of items of the device setting information contained in the updating data and type of items of the device setting information stored in the storage section,
    the updating section cancels updating of the device setting information stored in the storage section when the type of items contained in the device setting information of the updating data do not contain all of the type of items contained in the device setting information stored in the storage section, and
    the updating section updates the device setting information stored in the storage section when all of the type of items contained in the device setting information stored in the storage section are contained in the type of items contained in the device setting information of the updating data.

5. The image forming device as set forth in claim 4, further comprising:
    a notification section for transmitting a notification to a sender of the updating data,
    wherein:
    when canceling updating of the device setting information stored in the storage section, the notification section notifies the sender of the cancellation of upgrading of the program stored in the storage section.

6. The image forming device as set forth in claim 1, further comprising:
a notification section for transmitting a notification to a sender of the updating data,
wherein:
when executing updating of the device setting information stored in the storage section, the notification section notifies the sender of the execution of upgrading of the program stored in the storage section.

7. A computer-readable storage medium storing a control program of the image forming device as set forth in claim 1 for causing a computer to function as the aforesaid sections.

8. A control method of an image forming device, comprising the steps of:
(i) storing into a storage section device setting information of the image forming device and a program serving to bring the image forming device into operation, the device setting information comprising settings of paper feeder, shut-off times and toner saving;
(ii) upon reception of updating data that includes device setting information and version information, comparing the version information contained in the updating data and version information of the program stored in the storage section;
(iii) externally obtaining a program corresponding to the version information contained in the updating data; and
(iv) updating the device setting information, or both the device setting information and the program, that are stored in the storage section, depending on a result of the step (ii);
wherein:
in the step (iv), both the program and the device setting information stored in the storage section are updated when the version information contained in the updating data and the version information of the program stored in the storage section are not identical, the program stored in the storage section being updated by obtaining the program corresponding to the version information contained in the updating data, and
only the device setting information stored in the storage section is updated among the program stored in the storage section and the device setting information stored in the storage section when the version information contained in the updating data and the version information of the program stored in the storage section are identical.

9. An information processing image forming device, comprising:
a storage section for storing device setting information of the image forming device and a program serving to bring the information processing image forming device into operation, the device setting information comprising settings of paper feeder, shut-off times and toner saving;
an item comparison section for carrying out comparison, upon reception of updating data that includes device setting information and version information, between type of items of the device setting information contained in the updating data and type of items of the device setting information stored in the storage section;
an updating section for updating the device setting information, or both the device setting information and the program, that are stored in the storage section, depending on a result of comparison by the item comparison section; and
an acquirement section for externally obtaining a program corresponding to the version information contained in the updating data based on an instruction from the item comparison section,
wherein:
when the type of items contained in the device setting information of the updating data do not contain all of the type of items contained in the device setting information stored in the storage section, the updating section brings the acquirement section into operation to obtain the program corresponding to the version information contained in the updating data so as to update the program stored in the storage section and the device setting information stored in the storage section, and
when all of the type of items contained in the device setting information stored in the storage section are contained in the type of items contained in the device setting information of the updating data, the updating section updates only the device setting information stored in the storage section among the program stored in the storage section and the device setting information stored in the storage section.

10. The image forming device as set forth in claim 9, wherein:
the acquirement section obtains the program corresponding to the version information contained in the updating data, from a sender of the updating data or a manufacturer of the program corresponding to the version information contained in the updating data.

11. The image forming device as set forth in claim 9, further comprising:
a setting section for setting permission/prohibition of acquirement of a program corresponding to the version information contained in the updating data when the updating section concludes that the type of items contained in the device setting information of the updating data do not contain all of the type of items contained in the device setting information stored in the storage section,
wherein:
under the permission of acquirement of the program corresponding to the version information contained in the updating data, the updating section brings the acquirement section into operation to obtain the program corresponding to the version information contained in the updating data so as to update the program stored in the storage section and the device setting information stored in the storage section, and
under the prohibition of acquirement of the program corresponding to the version information contained in the updating data, the updating section cancels updating of the device setting information stored in the storage section.

12. The image forming device as set forth in claim 11, further comprising:
a notification section for transmitting a notification to a sender of the updating data,
wherein:
when canceling updating of the device setting information stored in the storage section, the notification section notifies the sender of the cancellation of upgrading of the program stored in the storage section.

13. The image forming device as set forth in claim 9, further comprising:
a notification section for transmitting a notification to a sender of the updating data,
wherein:
when executing updating of the device setting information stored in the storage section, the notification section notifies the sender of the execution of upgrading of the program stored in the storage section.

14. The image forming device as set forth in claim 9, wherein:
- the item comparison section carries out comparison between the device setting information contained in the updating data and the device setting information stored in the storage section in terms of type of items and data structure;
- the updating section brings the acquirement section into operation to obtain the program corresponding to the version information contained in the updating data so as to update the program stored in the storage section and the device setting information stored in the storage section when the type of items contained in the device setting information of the updating data do not contain all of the type of items contained in the device setting information stored in the storage section, or when all of the type of items contained in the device setting information stored in the storage section are contained in the type of items contained in the device setting information of the updating data but their data structures are not identical; and
- the updating section updates the device setting information stored in the storage section when all of the type of items contained in the device setting information stored in the storage section are contained in the type of items contained in the device setting information of the updating data and their data structures are identical.

15. A computer-readable storage medium storing a control program of the image forming device as set forth in claim 9 for causing a computer to function as the aforesaid sections.

16. A control method of an image forming device, comprising the steps of:
(i) storing into a storage section device setting information of the image forming device and a program serving to bring the information processing image forming device into operation, the device setting information comprising settings of paper feeder, shut-off times and toner saving;
(ii) upon reception of updating data that includes device setting information and version information, comparing type of items of the device setting information contained in the updating data with type of items of the device setting information stored in the storage section;
(iii) externally obtaining a program corresponding to the version information contained in the updating data; and
(iv) updating the device setting information, or both the device setting information and the program, that are stored in the storage section, depending on a result of the step (ii);
wherein:
in the step (iv), when the type of items contained in the device setting information of the updating data do not contain all of the type of items contained in the device setting information stored in the storage section, both the program and the device setting information stored in the storage section are updated, the program stored in the storage section being updated by obtaining the program corresponding to the version information contained in the updating data, and when all of the type of items contained in the device setting information stored in the storage section are contained in the type of items contained in the device setting information of the updating data, only the device setting information stored in the storage section is updated among the program stored in the storage section and the device setting information stored in the storage section.

* * * * *